(12) United States Patent
Opaterny

(10) Patent No.: US 7,657,338 B2
(45) Date of Patent: Feb. 2, 2010

(54) AUTOMATION SYSTEM WITH A CONNECTED SENSOR OR ACTUATOR

(75) Inventor: Thilo Opaterny, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/602,704

(22) Filed: Nov. 21, 2006

(65) Prior Publication Data

US 2007/0124001 A1  May 31, 2007

(30) Foreign Application Priority Data

Nov. 25, 2005  (EP) .................................. 05025832

(51) Int. Cl.
*G06F 19/00*  (2006.01)
(52) U.S. Cl. .................... 700/116; 340/3.1; 340/3.43; 700/115; 700/225; 700/226; 702/85; 702/90; 702/91; 702/104
(58) Field of Classification Search ............... 700/11, 700/108–110, 115–116, 225, 226; 340/3.1, 340/3.2, 3.43, 3.6; 702/85, 90, 91, 104
See application file for complete search history.

(56) References Cited

U.S. PATENT DOCUMENTS

| | | | | |
|---|---|---|---|---|
| 5,929,760 | A * | 7/1999 | Monahan .................. | 340/572.7 |
| 6,002,331 | A * | 12/1999 | Laor ........................ | 340/539.1 |
| 6,069,564 | A * | 5/2000 | Hatano et al. ............ | 340/572.7 |
| 6,880,106 | B2 * | 4/2005 | Donhauser et al. ............ | 714/35 |
| 7,165,728 | B2 * | 1/2007 | Durrant et al. ............... | 235/492 |
| 7,204,409 | B2 * | 4/2007 | Kumar et al. ................ | 235/375 |
| 2001/0042371 | A1 * | 11/2001 | Topfer-Hartung et al. ..... | 60/276 |
| 2004/0124988 | A1 * | 7/2004 | Leonard et al. ............. | 340/612 |
| 2005/0087235 | A1 * | 4/2005 | Skorpik et al. .............. | 137/554 |
| 2006/0043165 | A1 * | 3/2006 | Kumar et al. ................ | 235/375 |
| 2006/0043600 | A1 * | 3/2006 | Onodera et al. ............. | 257/774 |
| 2006/0047787 | A1 * | 3/2006 | Agarwal et al. ............. | 709/220 |
| 2006/0219776 | A1 * | 10/2006 | Finn ........................... | 235/380 |

FOREIGN PATENT DOCUMENTS

| | | |
|---|---|---|
| WO | WO 03/017015 A1 | 2/2003 |
| WO | WO 2005/015330 | 2/2005 |

OTHER PUBLICATIONS

"Panasonic develops RFID smartSD card", Palm Infocenter, PalmInfocenter.com, Oct. 4, 2004.*
"HF-0405-485-01 RFID Controller Installation Guide", Escort Memory Systems, Jul. 2006.*
"Gateway Ethernet Interface", Escort Memory Systems, Jul. 2006.*
Integrated Controller/Antenna HF-0405-01, Escort Memory Systems, Jul. 2006.*

* cited by examiner

*Primary Examiner*—Kidest Bahta
*Assistant Examiner*—Carlos Ortiz Rodriguez

(57) ABSTRACT

The invention relates to an automation system with a control unit, to which at least one sensor or actuator is connected. To connect it to the control unit, the sensor or actuator is connected to the connector which features an RFID chip with relevant data of the sensor or actuator. The data for use in the control unit can be read out by means of a reader.

17 Claims, 1 Drawing Sheet

AUTOMATION SYSTEM WITH A CONNECTED SENSOR OR ACTUATOR

CROSS REFERENCE TO RELATED APPLICATIONS

This application claims the benefits of European Patent application No. 05025832.6 filed Nov. 25, 2005. All of the applications are incorporated by reference herein in their entirety.

FIELD OF INVENTION

The invention relates to an automation system with a control unit connected to at least one sensor or actuator, to which a connector is assigned to connect it to the control unit, whereby a reader is provided for reading out data on an RFID chip which is intended for use in the control unit.

BACKGROUND OF THE INVENTION

This type of automation system is known for example from WO 2005/015330 A. It relates to a system and method for identifying passive automation components, especially sensors, actuators and power components. The automation device features a reader for reading out data stored on an RFID chip which is intended for use in the control unit.

Furthermore an automation system is known from numerous applications, which is used for performing a control task or which takes over the regulation of a process. It reads in the values of sensors and operating elements and processes these with internal states into output values for actuators. A modern automation system consists to a significant extent of software, so as to enable it to be adapted by users to suit their particular tasks.

The sensors convert physical variables such as pressure, temperature, brightness etc. into electrical values. The actuators in their turn convert electrical energy into forces, heat, light etc. The automation system consists of a processing unit and many modules to which the sensors and actuators are connected.

The number of different sensors and actuators is very large. So that a separate module does not have to be developed for each type of sensor or actuator, they are grouped together in accordance with their characteristics. For example most temperature sensors are resistors. To measure a temperature, a temperature-dependent resistor is measured. The resistance value can then be converted into a temperature value. The conversion can be undertaken in the module, but this means that the module must know the exact type of temperature sensor. The sensor or actuator type is notified to the module by means of software written for the purpose: The hardware configuration.

The hardware configuration has two primary tasks. It adapts the modules to the sensors and actuators and makes the addresses to be used available to the processing unit for each module. In addition it can check whether the parameterized modules are also really present. However only in few cases is a check made as to whether the correct sensor or actuator is connected. Although it is possible to check with the simpler sensors, such as the NTC thermistors or PTC thermistors used for temperature measurement, whether a resistor is connected at all but its temperature curve could be determined by a measurement curve. The same also applies to actuators. Whether a 10 W motor or a 10 kW motor is connected to the output has no part to play for the controller, since both are activated with a voltage of 0 V to 10 V. This voltage is converted by a regulator directly on the motor into the desired power. There are also actuators which are activated with currents of 4 mA to 20 mA. Confusing these two output types can have fatal consequences.

The controller cannot check whether the correct sensor or actuator is connected. The hardware configuration is tedious and error-prone. Every sensor and actuator has different characteristics. The manufacturer of sensors must work very precisely to keep within the desired tolerances. To this end manufacturing is followed by a calibration, i.e. fine tuning is carried out with a laser. Precise linear sensors are thus very expensive.

A higher accuracy can be obtained if the characteristic curves of the sensors error-prone. For each sensor a data sheet with the actual characteristic-curve must be supplied and this then entered into the automation system. Even if this information is entered electronically, using a diskette for example, errors cannot be avoided. In any event this process must be repeated if components are replaced, e.g. if spares are provided.

SUMMARY OF INVENTION

The object of the invention is to improve an automation system of the type mentioned above and a method for operating such a system so as to allow simple access to data of a sensor or actuator stored in the RFID chip.

The first object is achieved by the identifying features of the claims.

Advantageous developments of the invention are then to be found in the claims.

The further object is achieved in accordance with the features as claimed in the claims.

BRIEF DESCRIPTION OF THE DRAWINGS

Exemplary embodiments of the invention are explained in greater detail below with reference to a drawing. The figures show.

DETAILED DESCRIPTION OF INVENTION

Figure 1:
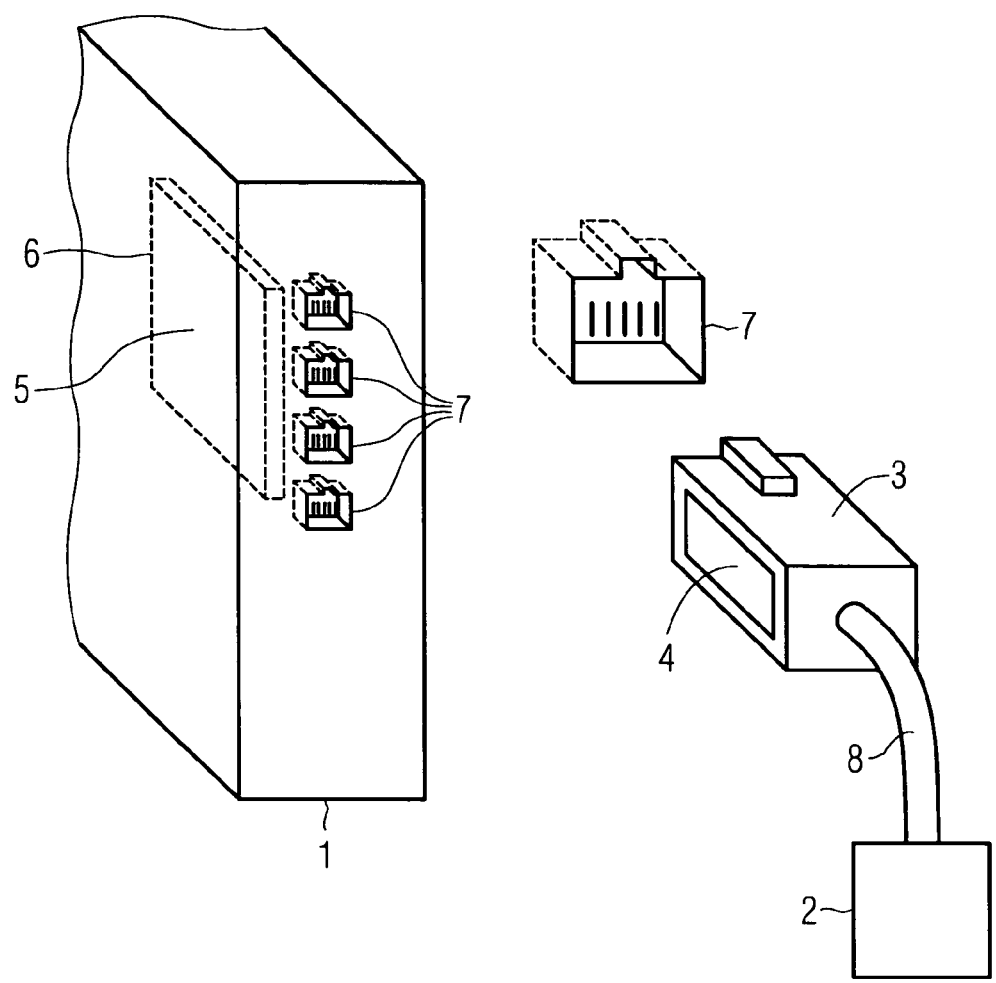
FIG. 1 a first inventive automation system and sensor or actuator connected to it and FIG. 2 an inventive configuration of an automation system with a connected sensor or actuator and a reader able to be connected between them.

FIG. 1 shows an automation system with a control unit 1 which features at least one module 6 with an integrated reader 5. The module 6 is electrically connected to terminals 7 accessible from outside the control unit 1. FIG. 1 also shows a sensor or actuator 2 which is permanently connected via a line 8 to a connector 3. The connector 3 is provided with an RFID chip 4 in which the relevant data of the sensor or actuator 2, e.g. characteristic curves, is stored. After the connector 3 is plugged to into one of the terminal sockets 7 the relevant data can be read out by the integrated reader 5 in the control unit 1. This ensures that the correct sensor or actuator 2 is connected. The parameterization and calibration is undertaken fully automatically and error-free. A further advantage is that expensive calibrations can be omitted during the manufacturing of the sensor or actuator 2, since the module 6 can adapt itself to the sensor 2 and the sensor or actuator 2 does not have to be adapted to the module. When a component is replaced the new characteristic curve is accepted into the system without any action on the user's part. The changing of the sensor or the actuator 2 can be documented by the system.

An additional benefit produced is that when the characteristic curve information is stored in encrypted form it can be certified that an original component is present. This makes it more difficult to add third-party hardware to the systems.

Figure 2:
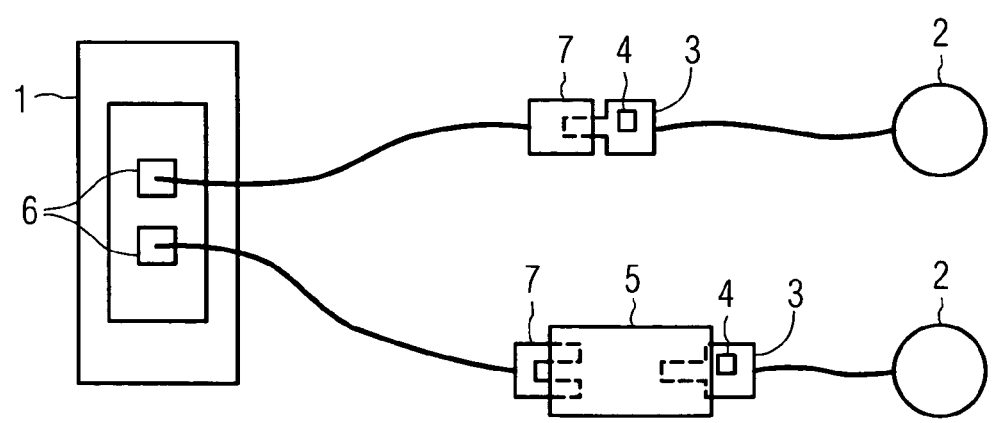

FIG. 2 shows an inventive configuration of an automation system with a control unit 1 which is electrically connected to a sensor or actuator 2. The control unit 1 features at least one module 6 which is connected via the lines routed outwards to terminal sockets providing a coupling. FIG. 2 further shows two sensors or actuators 2 which are permanently connected via a line to a connector 3. An RFID chip 4 is integrated into each of the two connectors 3. The upper part of FIG. 2 shows normal operation of the automation system with connected sensor or actuator 2, with the associated connector 3 plugged into the terminal socket 7. The lower part of FIG. 2 shows the commissioning state, in which case a reader 5 is looped in between connector 3 and terminal socket 7 in order to read out the relevant data stored in the RFID memory 4 of the sensor or actuator 2 and to forward it to the module 6. This is another way of ensuring that the correct sensor or actuator 2 is read out. The advantage of this solution lies in the fact that the module 6 no longer contains a reader and the wiring does not have to be modified accordingly.

In addition the arrangements shown in FIG. 1 produce a method for operating an automation system which features a control unit 1 to which at least one sensor or actuator 2 is connected. In this case relevant data of the sensor or actuator 2 is stored in an RFID chip 4 which is accommodated in the connector 3 assigned to the sensor or actuator 2. The data is read out from the RFID chip 4 by means of a reader 5 and then made available to the control unit 1.

The overall advantages produced by the integration of an RFID chip 4 into the connector 3 of a sensor or actuator 2 are as follows:

The authentication of the sensor or actuator 2;
Their automatic parameterization;
The precise calibration of the system and
The certification of the sensor or actuator 2.

The system becomes more convenient, more precise and more secure, with the costs for RFID chips being negligible.

The invention claimed is:

1. An automation system, comprising:
a control unit;
a sensor or an actuator external to the control unit;
a cable connected to the sensor or actuator for sense and/or control signaling between the control unit and the sensor or actuator, wherein the cable is external to both the control unit and to the sensor or actuator;
a connector on a distal end of the cable relative to the sensor or actuator, wherein the connector is a plug or socket connector for connecting the cable to the control unit;
a Radio Frequency Identification (RFID) chip physically attached to the connector;
the RFID chip containing characteristic curve data of the sensor or actuator;
an RFID chip reader connected to the control unit, wherein the RFID chip reader reads the characteristic curve data of the RFID chip; and wherein a module in the control unit automatically adapts to the sensor or actuator by obtaining the characteristic curve data from the RFID chip via the RFID chip reader when the connector is plugged into a terminal of the control unit;
wherein the RFID chip contains the characteristic curve data in encrypted form to authenticate that an original component is present.

2. The automation system as claimed in claim 1, wherein the RFID chip reader is directly physically attached to the control unit adjacent the terminal.

3. The automation system as claimed in claim 2, wherein the RFID chip contains relevant information of the sensor or actuator that insures a correct sensor or actuator is connected to the control unit.

4. The automation system as claimed in claim 3, wherein the RFID chip contains relevant information of the sensor or actuator for automatic parameterization of the sensor or actuator when the sensor or actuator is connected to the control unit.

5. The automation system as claimed in claim 2, wherein the cable is permanently connected to the sensor or actuator.

6. The system as claimed in claim 5, wherein the RFID chip reader is a component of the module in the control unit.

7. The automation system as claimed in claim 1, wherein the RFID chip reader is external to and separate from the control unit, wherein the connector is plugged into the RFID chip reader, and the RFID chip reader is plugged into the terminal of the control unit by a second cable via a second plug or socket connector, wherein the RFID chip reader reads the RFID chip on the connector and forwards the characteristic curve data to the control unit through the second cable.

8. The automation system as claimed in claim 7, wherein the RFID chip contains the characteristic curve data in encrypted form for certification of the sensor or actuator.

9. The automation system as claimed in claim 8, wherein the RFID chip contains relevant information of the sensor or actuator that insures a correct sensor or actuator is connected to the control unit.

10. The automation system as claimed in claim 9, wherein the RFID chip contains relevant information of the sensor or actuator for automatic parameterization of the sensor or actuator when the sensor or actuator is connected to the control unit.

11. The automation system as claimed in claim 7, wherein the cable is permanently connected to the sensor or actuator.

12. An automation system for physical process control, comprising:
a control unit;
an actuator external to the control unit;
a cable connected to the actuator for control signaling between the control unit and the actuator, wherein the cable is external to both the control unit and to the actuator;
a connector on a distal end of the cable relative to the actuator, wherein the connector is a plug or socket connector for connecting the cable to the control unit;
a Radio Frequency Identification (RFID) chip physically attached to the connector;
the RFID chip containing characteristic curve data of the actuator;
an RFID chip reader connected to the control unit, wherein the RFID chip reader reads the characteristic curve data; and wherein a module in the control unit automatically adapts to the actuator by obtaining the characteristic curve data from the RFID chip via the RFID chip reader when the connector is plugged into a terminal of the control unit.

13. The automation system as claimed in claim 12, wherein the RFID chip contains the characteristic curve data in encrypted form to authenticate the actuator.

14. The automation system as claimed in claim 13, wherein the RFID chip contains relevant information of the actuator that insures a correct actuator is connected to the control unit.

15. The automation system as claimed in claim 14, wherein the RFID chip contains relevant information of the actuator for automatic parameterization of the actuator when the actuator is connected to the control unit.

16. The automation system as claimed in claim 15, wherein the cable is permanently connected to the actuator.

17. The automation system as claimed in claim 16 wherein the RFID chip reader is external to and separate from the control unit, wherein the connector is plugged into the RFID chip reader, and the RFID chip reader is plugged into the terminal of the control unit by a second cable via a second plug or socket connector, wherein the RFID chip reader reads the RFID chip on the connector and forwards the characteristic curve data to the control unit via the second cable.

* * * * *